United States Patent [19]

Orthoefer et al.

[11] 4,346,122

[45] Aug. 24, 1982

[54] LOW-VISCOSITY, HIGH-NSI, HEAT-GELLING SOY ISOLATES

[75] Inventors: Frank T. Orthoefer, Decatur, Ill.; Lynn V. Ogden, Pleasanton, Calif.

[73] Assignee: A. E. Staley Manufacturing Company, Decatur, Ill.

[21] Appl. No.: 220,590

[22] Filed: Dec. 29, 1980

[51] Int. Cl.$^3$ .............................. A23J 1/14; A23J 3/02
[52] U.S. Cl. ..................................... 426/656; 426/104; 426/570; 426/582; 426/613; 426/614; 426/653; 426/652; 426/496
[58] Field of Search ................. 426/656, 104, 582, 93, 426/570, 657; 260/123.5

[56] References Cited

U.S. PATENT DOCUMENTS

| | | | |
|---|---|---|---|
| 2,495,706 | 1/1950 | DeVoss et al. | 99/17 |
| 2,561,333 | 7/1951 | Beckel et al. | 99/17 |
| 3,630,753 | 12/1971 | Melnychyn | 99/17 |
| 3,642,490 | 2/1972 | Hawley et al. | 260/123.5 |
| 3,669,677 | 6/1972 | Sair et al. | 260/123.5 |
| 3,723,407 | 3/1973 | Miller et al. | 260/123.5 |
| 3,734,901 | 5/1973 | Hayes et al. | 260/123.5 |
| 3,741,771 | 6/1973 | Pour El et al. | 99/79 |
| 3,870,801 | 3/1975 | Tombs | 426/92 |
| 3,870,812 | 3/1975 | Hayes et al. | 426/350 |
| 3,878,232 | 4/1975 | Hayes et al. | 260/412.4 |
| 4,072,669 | 2/1978 | Betschart | 426/656 |
| 4,091,120 | 5/1978 | Goodnight et al. | 426/656 |
| 4,151,310 | 4/1979 | Mattil et al. | 426/656 |
| 4,172,828 | 10/1979 | Davidson et al. | 426/656 |
| 4,188,399 | 2/1980 | Shemer | 426/656 |
| 4,234,620 | 11/1980 | Howard et al. | 426/656 |

OTHER PUBLICATIONS

Pushi, Modification of Functional Properties of Soy Proteins by Proteolytic Enzyme Treatment, Cereal Chem. 52: 655–664, (1975).

Wolf, Soybean Proteins: Their Functional, Chemical and Physical Properties, Jr. Agr. & Food Chem., vol. 18, No. 6, pp. 969–976, (1970).

*Primary Examiner*—Jeanette M. Hunter
*Attorney, Agent, or Firm*—M. Paul Hendrickson; Charles J. Meyerson

[57] ABSTRACT

High NSI dry vegetable protein isolates may be effectively utilized to replace egg albumin and/or milk caseinates in food recipes. The isolates are characterized as having an NSI of at least 90, substantially free from vegetable protein hydrolyzates, capable of forming insoluble heat-set gels and having aqueous Brookfield viscosities substantially lower than those which are obtained from conventional undigested vegetable protein hydrolyzates. The relatively neutral pH extraction conditions in the presence of sulfurous ions, coupled with its recovery without chemically or enzymatically hydrolyzing the protein constituents affords an effective method for manufacturing these unique isolate products. The isolates may be used to directly replace either casein or egg albumin in a wide variety of food recipes.

20 Claims, No Drawings

LOW-VISCOSITY, HIGH-NSI, HEAT-GELLING SOY ISOLATES

BACKGROUND OF THE INVENTION

Within recent years, imitation coffee creamers, milks, whipped toppings, cheese, sour creams, etc. have increasingly been accepted by consumers as a replacement for more costly natural dairy products. Milk proteins are most commonly used in these imitation dairy products because of their exceptional flavor and functional properties. The functional attributes of milk proteins in natural and synthetic cheese products are unique. These unique functional attributes play not only a vital role in the finished imitation dairy products, but also in their preparation.

The art has desired to replace milk protein with vegetable proteins. Unfortunately vegetable proteins do not possess the necessary prerequisital properties to function as a caseinate replacement in these imitation dairy products. Vegetable proteins would be a highly desirable imitation dairy product component, provided an economical and effective means for simulating the unique efficacy of casein could be found.

Vegetable proteins (including soy) are sensitive to a wide variety of conventional food processing and recipe conditions which do not normally affect milk proteins. Relatively mild physical processing conditions such as heating, drying, moisture level, etc. are known to adversely affect its properties. Factors such as the nature and character of the recipe additives, concentrations, ionic strength, pH, temperature and recipe preparation affect protein interreactions and its functional properties. Vegetable protein molecules undergo complex association, disassociation and chemical reactions with one another as well as other molecules which may be present in any given system. To compensate for such functional deficiencies supplemental non-dairy additives such as food stabilizers, gums, etc. are typically required. Such additives often result in more costly imitation products of an inferior quality. Consequently, vegetable protein isolates are usually relied upon primarily as a nutritional protein source in such imitation products instead of as a functional component.

An article by C. V. Morr (Jr. of Amer. Oil Chem. Soc., March 1979, page 383) reports that the functional and chemical properties of vegetable proteins are complex. Sedimentation by centrifugation studies are conventionally used to identify the different indigenous types of soy proteins. These centrifugal sediments are commonly referred to as the 2S, 7S, 11S and 15S fractions, which respectively corresponds to peak molecular weights of approximately 25,000; 160,000; 350,000 and 600,000. An illustrative native soybean seed analysis (on a weight basis) will typically yield approximately 7% 2S, 34% 7S, 42% 11S and 9% 15S. The major soy protein components are the 7S and 11S fractions. Factors such as seed type, climatic and growing conditions, as well as isolate processing conditions can alter the molecular weight distribution and the relative proportions of these protein fractions. The larger molecular weight fractions are comprised of a plurality of subunits which are known to undergo ionic association and disassociation. This contributes to the quaternary structure and complexity of the soy proteins when used in aqueous systems. These subunit interreactions significantly contribute or interfere with the functionality of soy properties in food recipes.

Soy proteins which gel upon heating have been reported. U.S. Pat. No. 3,870,801 by Tombs discloses a mesophase defined as "fluid aqueous composition, capable of being heat-coagulated, containing from 15 to 50% dissolved, undenatured plant protein and sufficient water-soluble salts to keep the protein dissolved and having a pH in the range of about 4 to 6." The mesophase is prepared from high NSI soy flakes by extracting the soluble constituents at a low temperature in the presence of excess water and with a small amount of sodium sulfite followed by the removal of insoluble carbohydrate material therefrom by centrifugation (pH 4.6–4.9), isolation of the protein from the supernatant and reconstitution of the isolate in an aqueous salt solution with special precautions being taken to avoid oxidative polysulfide formation. The mesophase is reportedly heat-coagulable at 90° C. and is useful as a protein binder in meat applications.

U.S. Pat. No. 4,188,399 by Shemer also discloses a heat-coagulable viscous soy protein product. According to the Shemer patent a high NSI soybean flour is subjected to aqueous extraction at a pH 5.1–5.9 in the presence of sodium sulfite at a low extraction temperature to extract soluble proteins and cabohydrates therefrom. The liquid protein is then adjusted to a pH 4.5 with phosphoric acid to provide a viscous fluid containing more than 70% of the 7S fraction. The viscous fluid material of Shemer is disclosed as a heat-coagulable binder for synthetic and natural meat applications.

British Patent Specification No. 1,377,392 discloses a dry, substantially undenatured salt-containing soy protein composition. The soy protein isolate "entails precipitation of the isolate from an aqueous extraction prepared from defatted soy meal in the presence of a water-soluble sulphite, bisulphite, or dithionite salt, preferably an alkali metal (including ammonium) salt . . . ." According to the British patentees, the protein isolate is then reconstituted in an aqueous salt solution to form a liquid composition containing from 0–50% dissolved soy protein and spray-dried to provide a free-flowing pale cream powder which is reportedly useful in preparing foodstuffs such as soy protein extrudates. The spray-dried powder is described as readily reconstituted in water and set by heat at temperatures ranging from 80°–150° C.

A U.S. Patent by Melnychyn et al. (U.S. Pat. No. 3,630,753) discloses a process for producing a freeze-dried soy protein isolate. It is obtained by an alkaline extraction (e.g. pH 8.5) of the protein and water-soluble components in the presence of a specific type of oxidizing or thiol bearing reagents which are capable of reacting with disulfide linkages. The extraction is preferably conducted at about 170° F. which will result in partial hydrolysis of the protein. The crude extract is then clarified by centrifugation, the protein precipitated at pH 4.5 and 100° F. followed by its recovery by centrifugation, washing, its redissolving in water at pH 7.0, the freezing and lyophilizing thereof to obtain a dry soy protein isolate powder. The isolate is reportedly suitable in formulating liquid foods such as imitation milk and infant feeding formulations.

Additional references reporting upon the gelation properties of soy protein include Puski (Cereal Chem. 52:665-664 (1975)); Circle et al. (Cereal Chem. 41:157-172 (1964)); Catsimpoolas et al. (Cereal Chem. 47:559-570 (1970)); U.S. Pat. Nos. 3,741,771 by Pour-El et al.; 2,561,333 by Beckel et al.; 3,870,812 by Hayes et al. and 2,495,706 by DeVoss et al. Further references disclosing the affect of reducing agents upon protein fractions include Briggs et al. (Archieves of Biochemistry and Biophysics 72:127-144 (1957)); Nash et al. (Cereal Chem. 44:183-192 (1967)) and Wolf (Jr. Agr. Food Chem. 18: No. 6, 969-976 (1970)).

Recognizing a long-felt need, the inventors have discovered that vegetable proteins can be effectively converted into an isolate product form which will permit its usage in imitation dairy products. These unique vegetable proteins may be obtained under preparatory conditions which are believed to restructure the native protein constituents into a unique, high-NSI, low viscosity producing isolate product. Although high NSI soy isolate hydrolyzates are known, commercial grades of soy isolate products which have not been subjected to enzymatic or chemical hydrolysis typically have a water solubility ranging between about 20 to about 70 NSI (nitrogen solubility index). Substantially unhydrolyzed soy isolates of an NSI of 100 are now possible. Unlike conventional isolates which fail to possess the characteristics of milk caseinates the subject isolates have been found to be unexpectedly useful as a partial or complete replacement for milk caseinates. The water-solubility, bland flavor, ability to form clear, tender, elastic, heat-induced gels (as opposed to brittle, non-elastic or rigid gels), water-absorption, fat emulsification, tolerance to salt and other dairy product additives uniquely distinguish these isolates from conventional isolates. The composite properties of these unique vegetable protein isolates render them useful for applications heretofore deemed impossible with conventional vegetable protein isolates.

DESCRIPTION OF THE INVENTION

According to the present invention there is provided a dry vegetable protein isolate useful for preparing imitation dairy products, said isolate characterized as: (a) having an NSI of at least 90, (b) substantially free from vegetable protein hydrolyzates, (c) forming an insoluble gel when reconstituted in water at a 15% by weight protein isolate concentration and heated to 85° C. for 30 minutes, and (d) yielding an aqueous isolate solution viscosity of less than $1 \times 10^5$ cps when reconstituted with water at 22° C. and a 15% by weight (d.s.b.) isolate concentration.

The NSI (nitrogen solubility index) is a standard test (AOCS BA1165-Official Method) for determining the water solubility of protein products. The dry vegetable isolates of this invention will typically have an NSI of at least 90 with an NSI of at least 95 being most typical. Although enzymatically and/or chemically hydrolyzed vegetable protein products will often approach these high NSI values, conventional unhydrolyzed vegetable protein isolates are generally characterized as having substantially lower NSI values. As shown in the examples, the present invention provides a means for producing 100 NSI vegetable protein isolates essentially free from chemically or enzymatically modified protein hydrolyzate products.

Another conventional technique to increase the NSI or water-solubility of an isolate product is to separate and recover the more water-soluble protein fractions from proteinaceous vegetable materials. Fractionation is expensive and provides an isolate product in which only a portion of the total vegetable protein composition is utilized. Contrary to prior beliefs, it has now been discovered that the indigenous components of vegetable proteins can be effectively converted into a high NSI isolate without subjecting the isolate to enzymatic or chemical hydrolysis or costly fractionation techniques. Differential scanning calorimetry tests (often used to ascertain the degree of transformation or modification of the protein from its native form) reveal that the isolates of this invention provide protein constituents more closely related to the native seed material in comparison to conventional vegetable protein isolates.

Another unique characteristic of the present isolates is their thermal gelling properties. The reconstituted isolates (in water at 15% by weight dry substance basis, (d.s.b.) when heated at 85° C. for 30 minutes, form a gelled mass. This gelled mass physically resembles those obtained by heat denaturing of egg albumin (e.g. fried or boiled egg whites). Under these heat-setting conditions, the fluid or flowable aqueous isolate solution is converted into a pliable, resilient, thermoset gelled mass possessing sufficient cohesiveness to retain its structural integrity. Similar to hard boiled egg whites or natural cheeses, these gelled isolates may likewise be sliced or grated. The gel strength of these heat-set isolates are typically less than 15.0 mm penetration (at 15% d.s.b. and 20° C.) as determined with a penetrometer (Precision Instrument penetrometer equipped with a Precision Instrument 30 g cone depressed for 5 seconds). Gel strength of less than 10.0 mm (e.g. 2.0 mm-9.0 mm range) as well as those approximating the 5.0 mm to 7.5 mm penetration range of egg albumin are provided by the present invention.

Isolates which, upon reconstitution and heat gelation, form clear translucent gels are advantageously provided by this invention. As more fully elaborated upon in the examples, such isolates may be prepared by clarifying the extract (centrifugation, filter press, etc.) so as to remove substantially all of the non-proteinaceous water-insolubles (primarily carbohydrates and fiber) from the extracted protein prior to the protein isolation step.

Another salient attribute of the subject isolates is their ability to form low viscosity solutions at a high isolate solids concentration. Atypical of conventional unhydrolyzed and unfractionated vegetable isolates which form highly viscous solutions at a 15% d.s.b. isolate concentration (e.g. $>2 \times 10^5$ cps), dry isolates yielding aqueous solutions of less than $1 \times 10^5$ cps (at 15% d.s.b. and 22° C.) and most typically less than $5 \times 10^4$ cps are provided by this invention. The unexpectedly high order of water-solubility coupled with the low aqueous viscosity attributes and heat gelling properties closely parallel the unique functional attributes of milk proteins and egg albumin. These functional properties render the subject isolates well suited as a caseinate or egg albumin replacement.

The dry vegetable protein isolates of this invention may be suitably prepared by a method comprising the steps of: (a) extracting water-soluble constituents from an aqueous vegetable proteinaceous material slurry at a pH between 6.5 and 8.0 and an effective amount of sulfurous ions sufficient to measurably reduce the viscosity of the aqueous solution below that level obtained by carrying out the extraction without the sulfurous ion; (b) partitioning substantially all of the water-soluble constituents from the water-insoluble constituents of said extracted slurry to provide a clarified extract; (c) recovering a major weight portion of the extracted water-soluble protein constituents from the aqueous slurry; (d) dissolving the recovered protein constituents in water to form an aqueous solution thereof; and (e) dehydrating the aqueous solution to provide a dry vegetable protein isolate.

The extraction should be conducted in such a manner so as to effectively extract all of the water-soluble protein components from the seed material without digesting or hydrolyzing the protein. Although slightly acidic extraction conditions may be used, (e.g. pH 6.0 or higher) definite advantages are obtaind under slightly alkaline extraction conditions (e.g. pH<8.0). The extraction step may be conducted on a batch or continuous basis (e.g. countercurrent extraction).

Defatted soybean materials when slurried with water will typically yield a slurry having a pH 6.6–6.7. More effective extraction of these two most predominant soy protein fractions (i.e. 7S and 11S) is obtained by adjusting the slurry pH to a neutral or slightly alkaline pH. A variety of organic and inorganic bases may be used for this purpose. Divalent cations such as the alkaline earth hydroxides are prone to form complexes with the indigenous extracts of the seed material (e.g.proteins, phytins, carbohydrates thereof, etc.) and should be avoided. It is advantageous to utilize monovalent cationic hydroxides such as alkali metal hydroxides, to adjust the slurry to the appropriate alkalinity for the extraction and treatment step. When sodium hydroxide is used as a pH adjusting base, about 0.1 to about 1.0 parts (d.s.b.) for each 100 parts by weight protein d.s.b. will typically yield an extraction or treated pH between 7.0 to about 8.0. To operate within the pH 7.0–7.5 range, the amount of sodium hydroxide added to the extractant slurry (100 pbw protein d.s.b.) will typically fall within the range of about 0.2 to about 0.8 parts by weight. A corresponding equivalency of potassium hydroxide, about 1.4 times more, is required when it is used as an adjusting base.

Vegetable proteinaceous materials useful in preparing the isolates include defatted proteinaceous materials obtained from grain and oil-bearing seed materials such as peanuts, cottonseed, soybeans, sesame seeds, rape seed, safflower seeds, sunflower seeds, corn, wheat, mixtures thereof and the like.

Proteinaceous materials obtained from leguminous oil-bearing seed sources, particularly soy, are advantageously utilized as a vegetable protein source. Illustrative soy materials include soybean meal, soy flour, soy grits, soy protein concentrates and isolates, and mixtures thereof. High as well as low NSI soybean raw materials may be used.

In the manufacture of defatted leguminous materials the oils are typically extracted from dehulled seed materials (e.g. grit or flake form) with a hydrocarbon solvent system such as hexane. Most manufacturers rely solely upon hexane to extract the oil. Although the hydrocarbon extraction effectively removes substantially all of the oil, it cannot effectively remove certain malodorous and flatulating factors from the seed material. These difficult to extract factors, along with other non-proteinaceous contaminants, require a water-miscible organic solvent system (e.g. alcohol, acetone, etc.) in order to be effectively removed from the seed material. By extracting or treating the vegetable material with aqueous solutions of such water-miscible solvents (e.g. hexane/alcohol/water, alcohol/water, etc. system) such as disclosed in United States Pat. Nos. 3,734,901 and 3,878,232, Jr. of the American Oil Chemist Society 37: 217-219, 1960 and copending U.S. patent application Ser. No. 973,194 now U.S. Pat. No. 4,265,925 entitled "Bland Vegetable Protein Product and Method of Manufacture" filed Dec. 26, 1978 by Campbell et al.) exceptionally bland isolates with improved functionality in imitation dairy and egg formulations are obtained.

Full-fat soybean flakes or grits extracted with an azeotropic solvent mixture of hexane, lower alkanol ($C_1$–$C_3$ and particularly ethanol) and water (e.g. provided by moisture content of the bean or with added water), partially or substantially hexane defatted soy flakes or grits further submitted to the azeotropic solvent mixture to extract these difficult to extract factors, as well as concentrates obtained by aqueous ethanol extractive techniques, are particularly suitable starting raw materials for making the isolates of this invention. Bland, defatted soy flakes and grits subjected to azeotropic hexane/ethanol/water extraction and desolventization are the preferred vegetable protein source material for making the isolates of this invention.

The water to protein ratio of the slurry may vary considerably depending upon the nature of the protein source material. In the case of soy proteins (e.g. soy grits, defatted soybean flakes, soy concentrates, soy isolates, etc.), the water to protein ratio illustratively ranges from about 8:1 to 20:1 or higher. At the high solids level the extracted solution tends to develop an excessive viscosity for effective handling and extraction. The yield of protein extracted from the vegetable seed material in the presence of the sulfurous ion appears to be concentration dependent. About 20–40% by weight of the total seed protein will typically remain with the balance being extracted under the processing conditions of this invention. About 4% to about 8% of the total seed protein content constitute whey proteins and will typically not be recovered as part of the dry isolate product. In a single stage extraction a 10:1 water to soy grit weight ratio will respectively yield about 50% to 55% recovery of the total seed protein. A countercurrent extraction conducted at a 10:1 water to soy grit ratio can effectively extract at least about 60% of the total seed protein with more than 55% thereof being a recoverable protein. Pragmatically the water to protein weight ratio will usually range from about 8:1 to less than 15:1 and advantageously at a weight ratio of about 9:1 to about 12:1.

The temperature of the extraction medium is maintained at a level sufficiently low so as to retain the protein molecules in essentially the native state, yet high enough to effectively extract the water-soluble protein from the seed materials. The viscosity characteristics of the recovered dry isolate product is directly related to the temperature and time interval the water-soluble protein solutes are processed at a given temperature. The extraction will typically require at least 40 minutes with about an hour or more generally being required to obtain satisfactory production yields. The time/temperature affect upon viscosity for a 10% protein solute concentration having a 25 cps will typically increase to 40 cps after heat treating at 62° C. for 150 minutes, 200 cps at 65° C. for 120 minutes, >100 cps at 70° C. for 30 minutes and 400 cps at 73° C. for 8 minutes. Illustrative extracting temperatures range from about 10° C. to 50° C. (or higher, provided not for prolonged periods of time) may be utilized under the appropriate extracting conditions to extract the vegetable protein from the seed material. The more elevated extraction temperatures will produce dry isolates which yield more viscous solution upon reconstitution in water than those conducted at a lower temperature. Extraction temperatures ranging between 20° C. to about 40° C. (preferably 25° C.–35° C.) are particularly effective.

The presence of a small amount of sulfurous ion significantly enhances the efficacy of the protein extraction and places the protein constituents in a form which permits their recovery in the desired end product. The sulfurous ion permits the extraction to be conducted at a higher protein solids level, significantly improves upon the total yield of extracted protein from the seed material and the preservation of protein molecules in a form suitable to be further processed into the isolate products of this invention. The sulfurous ion concentration should be sufficient to measurably decrease the viscosity of the extractant solution in comparison to that which would have been achieved had it not been added to the extraction medium. The water-soluble salt of sulfurous acid effectively reduces the vegetable protein disulfide linkages to thiol groups. This permits molecular and intermolecular restructuring of the tertiary and quaternary structure of the protein within the aqueous extract. This results in significantly greater water-solubility and concomitant reduction in solution viscosity and a significant improvement in recoverable protein yields with further improvement being obtained at a concentration of at least $2.2 \times 10^{-4}$ and particularly at about $4 \times 10^{-4}$ to about $4 \times 10^{-3}$ mole level for each mole of protein nitrogen.

Aqueous sulfurous acid solutions or precursors such as sulfur dioxide or water-soluble salts that form sulfurous acid when added to water may be used for this purpose. Illustrative water-soluble salts of sulfurous acid include the alkali metal salt sulfites (e.g. potassium or sodium salts of sulfite, bisulfite, pyrosulfite, metabisulfite, lithium sulfite) and other water-soluble producing salts of cations (e.g. ammonium sulfite, bisulfite, etc.), mixtures thereof and the like. Polyvalent metal salts known to form chelates with the proteins or cause its precipitation in aqueous solutions should be avoided.

In order to obtain a dry isolate possessing exceptional solution and thermoset properties, the water-insolubles are removed from the extract. If allowed to remain, such insolubles will occlude or form complexes with the protein isolate. By removing such insolubles, it is possible to obtain a dry isolate which will, upon reconstitution with water, form clear solutions and heat-set into clear, translucent gels. Clarifying techniques such as filtration or centrifugation may be used to remove substantially all the insolubles from the extract.

The clarified vegetable protein solutes may then be appropriately separated from the solubles (e.g. soy solubles) by adjusting the extract to the isoelectric point of the protein to curd or precipitate it therefrom. In general, the curding pH for most vegetable proteins typically falls within the pH 4.0–5.0 range and most suitably between about pH 4.2 to about 4.6 for soy protein. For soy protein isolates processed in accordance with this invention, a curding pH between about 4.3 to about 4.5 has been found to be particularly effective.

Conventional organic or mineral acids may be used to adjust the pH and curd the protein isolates from the clarified solution. Lactic acid, citric acid and the like are illustrative organic acids while sulfurous, hydrochloric, sulfuric and phosphoric are illustrative mineral acids. The protein curd may be separated from the soy solubles by conventional removal techniques such as filtering, centrifugation, decantation, etc.

Substantially all of the residual or occluded water-soluble carbohydrates, proteins, minerals and other contaminants may be removed from the curd by conventional washing techniques which prevent the protein from redissolving (e.g. at the protein isoelectric pH). The neutral extraction conditions in the presence of sulfurous ion, coupled with the washing step, provides the means for producing a dry isolate product which, when reconstituted in water at the 10% by weight concentration will, be free from any organoleptically detectable level of saltiness. Water-soluble salts of sulfurous acid may be effectively used as a wash ingredient to retain the protein molecules in a suitable form for further processing.

The remaining isolate processing steps are designed to provide the protein in a stable molecular form so as to permit its conversion and recovery into the unique dry isolates of this invention. In general, this can be accomplished by neutralizing the curded protein with a sufficient amount of base to form an aqueous protein solution which has a pH within the range used in the aforementioned extraction step. Suitable bases for the neutralization and redissolution of the curded protein in water include those used to adjust the slurry to a neutral extraction pH. Excessively high or low pH levels fail to provide a suitable substrate for converting the dispersed protein into the desired isolate product. More alkaline pH adjustment (e.g. >pH 8.0) adversely affect the product viscosity and taste (e.g. soapy taste) and can result in undesirable hydrolyzates or by-products.

Improvements to the dry isolate product are obtained by converting substantially all of the protein molecules to a water-soluble proteinate form. This may be accomplished by neutralization of the protein molecules with a sufficient amount of a monovalent cationic base to provide a slightly alkaline proteinate solution thereof (e.g. pH 7.0–7.8). Aqueous proteinate solutions having a pH of less than 7.5 (especially at about a pH 7.0–7.3) are most appropriately used to prepare the unique dry isolate products of this invention.

A small amount of sulfurous ion may be effectively used to prevent premature chemical and/or physical restructuring of the protein into non-functional components. The presence of the sulfurous ions also permits the process to be operated at a higher protein concentration while maintaining the solution viscosity at a satisfactory processing level for dehydration. The amount of sulfurous ion needed for this purpose is exceedingly small. Trace amounts (e.g. analytically detectable amounts) such as those residual levels remaining in the product after the extraction step or curd washing with sulfurous acid or salts will be generally sufficient for this purpose. Alternatively an effective level of the water-soluble salts may be directly added to the aqueous proteinate solution during its preparation or prior to its thermal treatment. Excessive sulfurous acid salt levels can adversely affect the organoleptic characteristics of the dry isolate and should be avoided.

The small amount of sulfurous ion used to prepare the dry isolates of this invention is generally not sufficient enough to prevent microbiological contamination. Moreover, certain microorganisms metabolize certain sulfurous ions and remain unaffected by its bactericidal activity. Since the preparatory conditions herein effectively place the vegetable isolate in a stable form, the isolate solution may be pasteurized. As previously mentioned, temperatures in excess of 70° C. have a much more pronounced affect upon the viscosity attributes of the isolate product than those thermally treated at lower temperatures. By thermally treating (e.g. 70° C.

to 90° C.) the aqueous isolate solution for a relatively short time interval (less than one minute) and immediately cooling the heated isolate to a temperature of less than 70° C. and preferably less than 65° C., pasteurized, dry isolates of a low viscosity may be obtained. Cooling of the aqueous solution to less than 70° C. (e.g. 50° C.–65° C. or lower) will typically inhibit the isolate from gelling and place it in a form suitable to be recovered.

Although the protein concentration of the aqueous solution may broadly range from about 5% to about 30% by weight (d.s.b.) the protein solids level is advantageously at least 10% by weight and less than 25% by weight and preferably within the 10%–20% range.

Upon completion of the pasteurization step, the aqueous solution is dehydrated to provide a dry isolate product. This may be appropriately accomplished by conventional dehydration techniques such as freeze-, vacuum-, drum-, spray-, etc. drying. The dehydrated isolate product will normally contain less than 10% moisture with a total moisture content ranging from about 4% to about 8% being most typical. Spray dryers operated at outlet temperatures ranging from about 70° C. to about 115° C. (preferably about 80° C.–100° C.) are particularly effective in producing the dry isolates of this invention.

In comparison to conventional dry isolates, product which typically yield aqueous solutions having a viscosity well in excess of 200,000 cps at 15% d.s.b. concentration (22° C.), the dry isolates herein will typically produce a Brookfield viscosity of less than 75,000 cps (15% by weight-20 rpm-22° C.). The ultimate viscosity attributes of the dry isolate will depend upon the quantum of heat applied to the isolate, the level of sulfurous ions and pH preparation conditions used to prepare the isolate product. By carefully controlling these preparatory conditions, the viscosity attributes of the dry isolate can be effectively regulated. Dry isolates which, when reconstituted in water at 15% d.s.b. concentration yield a predetermined Brookfield viscosity between 10,000–50,000 cps may be obtained by heating the aqueous protein solution for a period of time at elevated temperatures to impart the desired viscosity attributes to the protein solution prior to its dehydration.

The viscosity of the aqueous solution prior to its dehydration closely approximates the viscosity properties of the reconstituted dry isolate product. Aqueous solution viscosities of less than 5,000 cps or less than 1,000 cps at 15% d.s.b. will typically provide a suitable substrate for preparing dry isolates which, when reconstituted with water at a comparable solids level produces a Brookfield viscosity of less than 5,000 cps or 1,000 cps. This embodiment of the invention permits the art to easily prepare dry isolates which, upon reconstitution with water at 15% d.s.b. and 22° C. yield an isolate of a viscosity less than 500 cps, less than 250 cps and less than 100 cps, all of which are unexpectedly low in comparison to conventional undigested dry isolate products.

Another important embodiment of the present invention is the ability to provide a high NSI, low viscosity, heat-gelling, isolate product which contains a very low level of water-soluble salt. High levels of salt residues typically present in salt extracted isolate products (e.g. alkali metal salts such as sodium chloride) are eliminated by the present process. Water-soluble salts other than the small amount contributed by the sulfurous salts, are typically present in the present dry isolate product in an amount less than 2% of the total dry isolate weight and most typically at less than 1.5% by weight. Consequently the dry isolates do not impart a salt taste to the reconstituted recipes containing the dry isolate.

Gel chromatography of buffered salt extracts of spray-dried products subjected to the processing conditions of this invention indicate a rearrangement and restructuring of the vegetable protein constituents. It appears as though the process realigns the protein aggregate into a more stable and water-soluble form. Consequently the processed vegetable protein products may be concentrated and dried to provide a dried product which will dissolve in water. Studies upon buffered salt extracts obtained from spray-dried products reveal a predominant (meaning greater than any others) protein distribution of protein aggregates within the $1 \times 10^6$-$2 \times 10^6$ M.W. region relative to those protein constituents respectively found within either the less than $2 \times 10^5$ M.W., $2 \times 10^5$-$1 \times 10^6$ M.W. or the $>5 \times 10^6$-$2 \times 10^6$ M.W. regions. Typically the amount of protein aggregate having an M.W. greater than $2 \times 10^5$ will exceed those of a M.W. less than $2 \times 10^5$ by at least 80% and most typically by at least 85% by weight.

The processing conditions appear to restructure the water-soluble protein constituents into large molecular weight protein aggregates. This significantly reduces the lower molecular weight concentration with a proportionate increase in the high molecular weight protein aggregate concentration. In comparison to conventional dry isolate products, the dry isolate products are further characterized as having a disproportionately high level of buffered salt extractable protein at a molecular weight greater than $1 \times 10^6$. Typically the combined total of the 1-$2 \times 10^6$ and 2-$>5 \times 10^6$ M.W. region will constitute at least 30% of the total molecular weight distribution of the isolate buffered salt extract with those of a M.W. exceeding $2 \times 10^6$ M.W. being more prevalent (i.e. greater in amount) than those within the $2 \times 10^5$-$1 \times 10^6$ M.W. region as well as the less than $2 \times 10^5$ M.W. region.

Based upon the BioGel A-1.5 M gel filtration chromatography study as further illustrated by Example 1, it will be observed that the greater than $1 \times 10^6$ M.W. region typically exceeds the less than $5 \times 10^4$ M.W. region by a factor of more than fivefold with the Example 1 test sample exhibiting more than an eightfold difference. It has also been observed that less than 10% of isolate exists within the less than $5 \times 10^4$ zone.

The soy isolates of this invention may be used as a partial or complete replacement for egg albumins and/or milk proteins in a wide variety of industrial, pharmaceutical, agricultural and food applications. For food applications, it may be utilized as a caseinate or egg albumin replacement or extender. The bland flavor, low-viscosity, high water-solubility, clearness, etc. characteristics make it particularly well suited for use in edible fluid or beverage products. Its heat-gelling water-solubility, fat emulsification, water absorption, compatibility with a wide variety of food ingredients, tolerance to salt, etc. preparations are particularly useful for culinary, meat and dry applications. The caseinates and/or egg albumin conventionally used in baking, dairy or meat recipes may be extended or replaced with the isolates of this invention.

The dry isolate products prepared in accordance with this invention are highly soluble and therefore tend to form a protective hydrated isolate layer on the external portion of the particles when dispersed in water. This balling or doughing effect prevents complete dissolution of the isolate into water. Accordingly the NSI values for the dry isolate herein were determined by employing the following technique of placing the isolate into solution for nitrogen analysis.

NITROGEN SOLUBILITY INDEX (NSI)

(Shaker Bath Method)

APPARATUS

1. Blender cup, semimicro, (American Scientific Products, No. S8395-1-Container)
2. Blender, single speed Waring 700 (American Scientific Products, No. S-8346-5-Blendor).
3. Variable transformer, 0-140 V (Fisher Scientific No. 9-521-110).
4. Centrifuge (clinical, International Equipment Corp., Model CL, or equivalent).
5. Shaker bath (Precision Scientific Co., Model 25).

PROCEDURE

1. Pipette exactly 50.0 ml. deionized water into the blender cup.
2. Weigh (to nearest 0.1 mg) 5 g±0.01 g sample onto a tared N-free weighing paper.
3. Start blender (pre-set to 8500 rpm) and rapidly (2 sec.) spinkle sample into the water vortex.
4. Continue blending for exactly 10 seconds after completion of sample addition.
5. Reweigh sample paper and correct the sample weight for sample remaining on the paper.
6. Add 2 drops of octyl alcohol defoamer to the cup and mix contents by swirling (2 sec.).
7. Allow foam to collapse (10-15 seconds), then pour contents of cup through a glass funnel into a 4 oz. glass bottle (screw cap). Allow blender cup to drain 30 seconds.
8. Cap bottle and place in shaker bath equilibrated to 30°±0.5° C.
9. Adjust shaker to 120 oscillations/minute and allow bottle to shake for 20 minutes.
10. Take out bottle and immediately decant about 40 ml. into a 50 ml. centrifuge tube.
11. Centrifuge for exactly 15 minutes at 2650 rpm (Clinical centrifuge, setting B).
12. Allow centrifuge to come to rest slowly so as to not disturb the protein sediment.
13. Decant supernatant through fluted paper (Eaton-Dikeman #513, 12.5 cm).
14. Transfer exactly 20.0 ml filtrate into 800 ml Kjeldahl flask and analyze for nitrogen.

The following examples are illustrative of the invention.

EXAMPLE 1

A 100 NSI and 60 cps (15% in water) spray-dried isolate was prepared by initially slurrying 1200 pbw bland defatted soy flakes[1] in 17,500 pbw water (30° C.) under low speed agitation. To facilitate the protein extraction from the soy flakes 0.6 pbw sodium metabisulfite was added to the slurry followed by the addition of 6.75 pbw sodium hydroxide (50% water solution) to adjust the slurry to a pH 7.1. While maintaining the slurry at pH 7.1 and 30° C., the slurry was continuously stirred for 75 minutes to complete the extraction of water-solubles from the soy flakes.

[1]-BLAND 50—Desolvenized soy flakes defatted with a hexane/ethanol/water azeotrope—manufactured and distributed by the A. E. Staley Manufacturing Company, Decatur, Ill.

Then 400 pbw filter aid[2] was added with continual stirring to the extracted slurry. The extracted slurry was clarified by continuously recycling it through a filter press (cloth filter) until the water-insolubles had been removed and a clear filtrate product was obtained.

[2]-diatomaceous earth

The clear filtrate was adjusted to pH 4.3-4.5 with 51 pbw 20° Be muriatic acid while continually stirring at a low speed. The precipitated curd was then allowed to quiescently settle in the curding tank for one hour. The supernatant was withdrawn by decantation. A water wash consisting of 41,700 pbw water and 13 pbw 20° Be muriatic acid (pH 4.5) was then added to the decanted curded soy protein and washed for one hour under low speed stirring. Thereafter the washed curd was allowed to quiescently settle for an hour in the curding tank. As much clear supernatant as possible was then decanted from the washed curd.

The curd was pumped to a neutralizing vesel equipped with a high speed impeller agitator. The curd was dissolved and converted to an aqueous sodium proteinate solution by slowly adding 15 pbw 50° Be sodium hydroxide to the curd while stirring vessel contents at high speed. The solution (pH 7.1) was held, while slowly stirred, for an additional period of time sufficient to permit a decrease in Brookfield viscosity of the solution (at 20° C., 12 rpm, #1 spindle) to less than 100 cps (about 2 hours). The proteinate solution (22° C.) was pumped (piston operated at 1200-1500 psig) to a Rogers Horizontal Spray Dryer equipped with eight spray nozzles (orifice-Cat. No. SIT 69 and Core Cat. No. STT-20 by Spraying Systems, Inc., Wheaton, Ill.), and spray-dried (150°-155° C. inlet and 71°-77° C. outlet temperatures) under a very slight vacuum (0.02-0.04 inch water draft). The spray-dried product when reconstituted in water at 15% d.s.b. had a solution viscosity of 60 cps (Brookfield viscosity-20 rpm-20° C.-#1 spindle). The spray-dried isolate product had an NSI of 100.

Two different gel filtration chromatographic separation techniques were used to ascertain the protein molecular weight distribution of the dry isolate product. The first separation technique utilized to characterize the dry isolate was the test procedure, as described in U.S. Pat. No. 4,234,620 by Howard et al. (e.g. see col. 11, line 16—column 12, line 9) which provided protein M.W. distribution zones of $>1.5 \times 10^6$, $1 \times 10^6$-$1.5 \times 10^6$, $1 \times 10^6$-$3.7 \times 10^5$, $3.7 \times 10^5$-$5 \times 10^4$ and $<5 \times 10^4$. The buffered-salt-extractable proteins (percent by weight basis) as ascertained by this test were 38.1% $>1.5 \times 10^6$, 17.6% $1$-$1.5 \times 10^6$, 30.4% $3.7 \times 10^5$-$1 \times 10^6$, 7.1% $5 \times 10^4$-$3.7 \times 10^5$ and 6.7% $<5 \times 10^4$.

The other gel filtration chromatography study was performed on a Pharmacea 90 cm $\times$ 1.3 cm I.D. column containing BioGel A-5 M resin, 100-200 mesh (BioRad Laboratories, Richmond, Calif.). A flow rate of 10 ml/hr. was maintained with Pharmacea P-3 parastaltic pump (Pharmacea Fine Chemicals, Upsala, Sweden, 2 mm I.D. tubing). The elution was monitored at 254 nm (LKB Instruments, Inc. Rockville, Md.) and 1 ml. fraction were collected LKB Model 7000 Ultrorac(R) fraction collector). The column buffer was comprised of 0.0325 M $K_2HPO_4$, 0.0026 M $KH_2PO_4$, 0.40 M NaCl, and 0.01 M 2-mercaptoethanol (reference W. J. Wolf, G. E. Babcock and A. K. Smith "Purification and Stability Studies of the 11 S component of Soybean Proteins", Archieves of Biochemistry and Biophysics 99, 265–274 (1962)).

A 5% (/w/w) solution of protein in Wolf's Buffer (0.0325 M $K_2HPO_4$, 0.0026 M $KH_2PO_4$, 0.40 M NaCl, 0.01 M 2 mercaptoethanol) was prepared and dialyzed (Spectropor membrane tubing #3 18 mm, M.W. cut-off 3500) overnight at 4° C. against Wolf's Buffer. The sample was then centrifuged at 10,000 rpm (12,000 X G) (Sovall refrigerated centrifuge, SS-34 head) for 30 minutes at 5.0° C. One ml. of the supernatant was applied to the column.

Individual fractions were assayed for protein as described by Bradford, M. M., Anal. Biochem. 72, 248–254 (1976). To 100 aliquots, 5 mls. of Bradford protein reagent was added. After mixing, the absorbance was read at 595 nm against a buffer reagent blank on the Beckman Acta II spectrophotometer.

Protein calculations were based on a standard curve using Bovine Plasma Gamma Globulin (BioRad Laboratories, Richmond, Calif. Standard I-#500-0005). The gel filtration chromatography column was calibrated with standards of known molecular weight thereby allowing the molecular weight of the samples to be evaluated. These standards included Apoferratin, Aldolase, Conalbumin, Ovalbumin and Cytochrome C. The void volume was determined with Dextran 2000. The column parameters were identical for both calibration and sample determinations.

For comparative purposes, molecular weight zones were chosen by use of a molecular weight standard curve. These zones were 2,000,000 M.W. and higher, 2,000,000–1,000,000 M.W., 1,000,000–200,000 M.W. and less than 200,000 M.W. The tabulated protein distribution represents the percent of total protein which elutes within a designated molecular weight region. The results of these studies are as follows:

| MOLECULAR WEIGHT DISTRIBUTION (% TOTAL PROTEIN) | | | |
| --- | --- | --- | --- |
| >2,000,000 | 2,000,000 to 1,000,000 | 1,000,000 to 200,000 | <200,000 |
| 18.4 | 15.9 | 51.0 | 14.7 |

The dry isolate was dissolved in water (15% by weight d.s.b.), heated at 85° C. for 30 minutes to provide a clear, elastic, tender, water-insoluble gel. The 7–8 mm gel penetration (penetrometer equipped with 30 gram cone) or gel strength value for this soy isolate gel was the same as those which were obtained from egg albumin under identical test conditions.

EXAMPLE 2

A cheese extender was prepared using the dry isolate of Example 1. The extender consisted of:
- 25%—Example 1 dry isolate
- 25%—Hydrogenated vegetable oil (Wiley m.p. 104° to 106° F.)
- 3%—Sodium aluminum phosphate
- 47%—Water Beta carotene The mixture was uniformly mixed and heated to melting on a hot plate. An equivalent weight of processed cheese was added to the hot mixture. The mix was remelted and stirred until a homogeneous mass was obtained. The fluid homogeneous mixture was then poured into a mold and cooled to 5° C. The solidified, cooled product possessed a melt, texture and mouthfeel similar to the processed cheese. A similar extender was prepared for Mozzarella cheese except $TiO_2$ was used to adjust color. The extended Mozzarella (50/50) was similar in taste, texture, mouthfeel and melt properties to the natural Mozzarella product.

EXAMPLE 3

An imitation hard boiled egg was prepared employing the dry isolate as an egg albumin and yolk protein replacement. The imitation egg white and egg yolk consisted of the following ingredients:

White formula

15% protein isolate
4% corn oil
81% water

Yolk formula

13% protein
4% corn oil
2% BINASOL 15 Starch[1]
82% water
tr. Annato color

[1]-BINASOL 15—A crosslinked hydroxypropylated tapioca starch manufactured and distributed by the A. E. Staley Manufacturing Company, Decatur, Ill.

The two formulas were mixed separately and each was homogenized through a hand homogenizer. The yolk-like material was placed in a glass tube 2.1 cm in diameter corked on one end to contain the liquid. The other end was covered and the tube was placed in a 100° C. oven and held about 1 hour to coagulate. The rod of coagulated material was removed from the tube and placed in a 4.8 dm diameter plastic bottle such that it stood in the center not touching the sides. The white material was poured around it occupying the space between the yolk like rod and the edge of the plastic cylinder. This unit was covered and placed in the oven at 100° C. for one hour. It was then cooled. The plastic was removed from the coagulated product. The product was sliced into sections. The imitation product resembled a hard boiled egg in texture and appearance.

Scrambled eggs were extended with an extender consisting of:
- 13.5% spray-dried protein isolate
- 4.0% corn oil
- 82.5% water The extender was prepared by blending in a standard household mixer and then homogenized. An equal volume of fresh whole eggs was then blended into the extender. The resultant mixture was then fried in hot butter and allowed to fry an additional time to develop the appropriate scrambled egg texture and mouthfeel.

EXAMPLE 4

A fluid whipped imitation dairy topping was prepared from the following ingredients:

| INGREDIENTS | PERCENT |
| --- | --- |
| Water | 49.8 |
| Hydrogenated vegetable oil | 26.0 |
| Sugar | 17.0 |
| SWEETOSE 4400[1] (corn syrup) | 4.0 |
| Example 1 spray-dried isolate | 1.5 |
| corn syrup solids 24 D.E. | 1.03 |
| Santelle EOM (ethoxylated monoglyceride) | 0.25 |
| Viscarin 402 (stabilizer) | 0.10 |
| Avicel (microcrystalline cellular starch) | 0.10 |

-continued

| INGREDIENTS | PERCENT |
| --- | --- |
| Span 60 (emulsifier) | 0.10 |
| Durem 104 (emulsifier) | 0.10 |
| Durlac 100 (emulsifier) | 0.016 |

[1]SWEETOSE 4400 - corn syrup manufactured and distributed by the A. E. Staley Manufacturing Company, Decatur, Illinois.

RECIPE PREPARATION

1. Add stabilizers and SWEETOSE to water and heat to 120° F.
2. Dry mix sugar, corn syrup solids, and protein and add to water.
3. Melt fat and add emulsifiers, and add to water mixture.
4. Pasteurize at 160° F. for 30 minutes. Cool to 120° F.
5. Homogenize through a two-stage homogenizer (1000 psi first stage and 500 psi second stage).
6. Cool as rapidly as possible to 40° F. Refrigerate overnight before whipping.

The whipped topping product was freeze-thaw stable and had a 0.33-0.37 specific gravity. The whipped topping possessed a stiff texture and dry appearance and had a foaming peak similar to whipped cream. Its texture, mouthfeel and taste were similar to whipped cream.

EXAMPLE 5

A moisture and fat resistant coating for bakery products was prepared by blending 12-20% dry isolate in 80-88% water, the pH was adjusted to pH 4.5 with hydrochloric acid, followed by homogenization to form a fully dispersed, stable protein in water dispersion. The dispersion was applied by brushing or spraying onto the surface of bakery products. The resultant coating when baked possessed an egg-like or lacquer sheen that is impermeable to water or oil based dressing such as ketchup, mayonnaise or margarine.

EXAMPLE 6

A freeze-thaw stable coffee whitener was prepared from the following recipe:

| INGREDIENTS | PERCENT |
| --- | --- |
| Water | 77.2 |
| Maltodextrin | 10.05 |
| Hydrogenated vegetable oil (m.p. 70-80° F.) | 6.5 |
| Hydrogenated vegetable oil (m.p. 98-102° F.) | 3.3 |
| Monoglyceride emulsifier | 0.6 |
| Example 1 isolate | 0.4 |
| Polysorbate 60 | 0.4 |
| Dipotassium phosphate | 0.3 |
| Carboxymethyl cellulose (stabilizer) | 0.25 |

RECIPE PREPARATION

1. Dissolve protein in water and heat to 120° F. with mixing.
2. Disperse emulsifier in melted fat. Add to protein solution.
3. Add remaining ingredients and dissolve by mixing.
4. Pasteurize at 160°-165° F. for 30 minutes.
5. Cool to 125°-135° F. Homogenize at 2500+500 psi through a two-stage homogenizer.
6. Cool to 40° F. immediately and refrigerate overnight before use.

EXAMPLE 7

A brine suitable for injection into meat products was prepared by dissolving the following ingredients in water:

| INGREDIENTS | PARTS BY WEIGHT |
| --- | --- |
| Water | 322.8 |
| Sugar | 18.8 |
| Phosphate (3 in 1) | 6.0 |
| Prague Powder (6.25% sodium nitrite) | 7.5 |
| Salt | 44.9 |
| Dry isolate | 100.0 |
|  | 500.0 |

The brine was prepared and injected into 1175 grams of pork. The pork was massaged in a candy coater then cooked to an internal temperature of 155° to 160° F. Cooking loss was 14%. The product had a good cured meat color, flavor, texture and appearance. The presence of soy protein was not detectable using these observations.

EXAMPLE 8

A quiche "Lorraine" was prepared using the following recipe: 4.47% bacon, cooked and crumbled, 10.85% Swiss cheese, diced or shredded, 54.85% milk, 0.19% green onions, sliced, 0.26% salt, 0.02% white pepper, 0.02% nutmeg, 14.67% whole eggs, 14.67% protein isolate water solution (20% by weight isolate). The unbaked pie shell was coated with the Example 5 isolate and fat mixture coating. Cook bacon and crumble. Shred or dice Swiss cheese. Sprinkle bacon, cheese, and onions into coated unbaked pie shell. Combine eggs and isolate solution, mix until homogeneous. Add milk, salt, pepper, and nutmeg. Mix and pour over mixture in pie shell. Bake at 450° F. for 15 minutes. Reduce heat to 350° F. and bake 20 minutes or until done.

What is claimed is:

1. A dry vegetable protein isolate useful for preparing imitation cheese products, said isolate characterized as: (a) having an NSI of at least 90, (b) substantially free from vegetable protein hydrolyzates, (c) forming an insoluble gel when dissolved in water at a 15% by weight protein isolate concentration and heated to 85° C. for 30 minutes, and (d) yielding an aqueous isolate solution viscosity of less than 100,000 cps when reconstituted with water at 22° C. and a 15% by weight (d.s.b.) isolate concentration.

2. The isolate according to claim 1 wherein the isolate is a dry soy isolate.

3. The isolate according to claim 2 wherein the isolate is characterized as having an NSI of at least 95.

4. The isolate according to claim 3 wherein the dry isolate is substantially free from aqueous alcohol extractable lipid constituents and water-insolubles.

5. The isolate according to claim 3 wherein the dry isolate when reconstituted in water at a 15% by weight isolate concentration yields a Brookfield viscosity of less than 100 cps.

6. The isolate according to claim 3 wherein the penetrometer value for water-insoluble gel is less than 10 mm.

7. The isolate according to claim 6 wherein the dry isolate when reconstituted in water at 15% by weight isolate concentration yields a Brookfield viscosity of less than 5,000 cps and the total amount of water-soluble salt other than the salts of sulfurous ions constitutes less than 1.5% by weight of the total dry isolate weight and the isolate is characterized as containing (on a buffered-salt-extractable protein weight basis) protein aggregates within the $1\times10^6$-$2\times10^6$ molecular weight region in an amount greater than the protein constituents within either the less than $2\times10^5$, the $2\times10^5$-$1\times10^6$ or $2\times10^6$-$5\times10^6$ molecular weight regions and the isolate contains less than 10% by weight protein constituents of a molecular weight less than 50,000.

8. A method for preparing a dry, undigested, high NSI, heat-settable vegetable protein isolate, said method comprising the steps of; (a) extracting water-soluble constituents from an aqueous vegetable proteinaceous material slurry at a pH between 6.5 and 8.0 with an effective amount of sulfurous ions sufficient to measurably reduce the viscosity of the aqueous solution below that level obtained by carrying out the extraction without the sulfurous ion, (b) partitioning substantially all of the water-soluble constituents from the water-insoluble constituents of said extracted slurry to provide a clarified extract, (c) recovering a major weight portion of the extracted water-soluble protein constituents from the clarified extract, (d) dissolving the recovered protein constituents in water to form an aqueous solution thereof, and (e) dehydrating the aqueous solution to provide said dry vegetable protein isolate.

9. The method according to claim 8 wherein the vegetable protein material consists essentially of defatted soybean material.

10. The method according to claim 8 wherein the aqueous slurry contains from about $4\times10^{-5}$ to about $4\times10^{-4}$ mole sulfurous ion for each mole of protein nitrogen.

11. The method according to claim 9 wherein the protein extraction is conducted in the presence of at least $2.2\times10^{-5}$ mole for each mole of protein nitrogen, a temperature ranging from about 25° C. to about 35° C. and a pH ranging from about 7.0 to about 7.5, the water-soluble protein constituents are recovered from a clarified aqueous solution by adjusting the clarified solution with an acid to a pH between about 4.2 to about 4.6 and recovering the curded protein therefrom, washing the curded protein to extract substantially all of the pH 4.2-4.6 water-solubles therefrom, dissolving the washed curded proteins in water at pH 7.0-7.5 to provide a proteinate solution and dehydrating the proteinate solution to provide a dry isolate.

12. The method according to claim 11 wherein the proteinaceous material consists essentially of soy protein defatted with a hexane/ethanol/water azeotrope, the water to protein weight ratio of the aqueous slurry ranges from about 8:1 to about 12:1, the sulfurous ion concentration ranges from about $4\times10^{-4}$ to about $4\times10^{-3}$ mole for each mole of protein nitrogen and the partitioning of the water-soluble constituents from the water-insoluble constituents and washing of curded protein are sufficient to provide a dehydrated isolate which contains less than 2.0% by weight salt residues and which upon reconstitution with water and heating will heat-set into a clear, translucent gel.

13. In a food composition comprised of carbohydrate, triglyceride and protein wherein the protein is at least one protein selected from the group consisting of egg albumin and milk caseinate, the improvement which comprises replacing at least a portion of said protein in said composition with a dry vegetable isolate characterized as: (a) having an NSI of at least 90, (b) substantially free from vegetable protein hydrolyzates, (c) forming an insoluble gel when reconstituted in water at a 15% by weight protein isolate concentration and heated to 85° C. for 30 minutes, and (d) yielding an aqueous isolate solution viscosity of less than 100,000 cps when reconstituted with water at 22° C. and a 15% by weight (d.s.b.) isolate concentration.

14. The food composition according to claim 13 wherein the dry vegetable protein isolate consists essentially of soy isolate.

15. The food composition according to claim 14 wherein the soy isolate has an NSI of at least 95 and upon heat gelling forms a water-insoluble gel having a penetrometer value of less than 10 mm.

16. The food composition according to claim 14 wherein the soy isolate is characterized as having a Brookfield solution viscosity (22° C. and 20 rpm) of less than 100 cps when reconstituted with water at 15% by weight isolate concentration.

17. In a method for preparing a food composition comprised of carbohydrate, triglyceride and protein wherein the protein is at least one protein selected from the group consisting of egg albumin and milk caseinate is used to prepare said food composition, the improvement which comprises replacing at least a portion of said protein in said composition with a dry vegetable isolate characterized as: (a) having an NSI of at least 90, (b) substantially free from vegetable protein hydrolyzates, (c) forming an insoluble gel when reconstituted in water at a 15% by weight protein isolate concentration and heated to 85° C. for 30 minutes, and (d) yielding an aqueous isolate solution viscosity of less than 100,000 cps when reconstituted with water at 22° C. and a 15% by weight (d.s.b.) isolate concentration.

18. The method according to claim 17 wherein the dry vegetable protein isolate consists essentially of soy isolate.

19. The method according to claim 18, wherein the soy isolate has an NSI of at least 95 and upon heat gelling forms a water-insoluble gel having a penetrometer value of less than 10 mm.

20. The method according to claim 19 wherein the soy isolate is characterized as having a Brookfield solution viscosity (22° C. and 20 rpm) of less than 100 cps when reconstituted with water at 15% by weight isolate concentration.

* * * * *

UNITED STATES PATENT AND TRADEMARK OFFICE
CERTIFICATE OF CORRECTION

PATENT NO. : 4,346,122

DATED : August 25, 1982

INVENTOR(S) : Frank T. Orthoefer and Lynn V. Ogden

It is certified that error appears in the above-identified patent and that said Letters Patent are hereby corrected as shown below:

Column 2, line 66, for "52:665-664" read ---52:655-664---.
Column 4, line 14, for "(d.s.b.)" read ---(d.s.b.))---.
Column 6, line 67, for "solution" read ---solutions---.
Column 8, line 8, for "concentration will," read ---concentration, will---.
Column 10, line 62, for "dry" read ---dairy---.
Column 11, line 42, for "for 20 minutes" read ---for 120 minutes---.
Column 12, line 1, for "Desolvenized" read ---Desolventized---.
Column 13, line 3, for (/w/w)" read ---(w/w)---.

Signed and Sealed this

Twenty-sixth Day of October 1982

[SEAL]

Attest:

GERALD J. MOSSINGHOFF

Attesting Officer

Commissioner of Patents and Trademarks